United States Patent
Chang et al.

(10) Patent No.: US 8,583,123 B2
(45) Date of Patent: Nov. 12, 2013

(54) METHODS FOR CONTROLLING RADIO LINKS IN A CELLULAR COMMUNICATION SYSTEM

(75) Inventors: Chia-Lan Chang, Taipei County (TW); Li-Chi Huang, Taipei Hsien (TW)

(73) Assignee: Mediatek Inc., Hsin-Chu (TW)

(*) Notice: Subject to any disclaimer, the term of this patent is extended or adjusted under 35 U.S.C. 154(b) by 1188 days.

(21) Appl. No.: 12/176,542

(22) Filed: Jul. 21, 2008

(65) Prior Publication Data

US 2010/0015985 A1 Jan. 21, 2010

(51) Int. Cl.
*H04W 36/00* (2009.01)
*H04W 40/00* (2009.01)

(52) U.S. Cl.
USPC .......................................... 455/442; 455/448

(58) Field of Classification Search
USPC ............................ 455/442, 443, 436; 370/331
See application file for complete search history.

(56) References Cited

U.S. PATENT DOCUMENTS

| | | | |
|---|---|---|---|
| 5,267,261 A | 11/1993 | Blakeney, II et al. | |
| 5,722,074 A | 2/1998 | Muszynski | |
| 6,324,401 B1 | 11/2001 | De Hoz Garcia-Bellido et al. | |
| 6,330,449 B1 | 12/2001 | Kim | |
| 6,570,856 B1 | 5/2003 | Freeburg et al. | |
| 6,725,039 B1 | 4/2004 | Parmar et al. | |
| 6,850,770 B2 | 2/2005 | Hwang | |
| 6,907,245 B2 | 6/2005 | Ohlsson et al. | |
| 6,982,959 B1 | 1/2006 | Salonaho et al. | |
| 7,003,290 B1 | 2/2006 | Salonaho et al. | |
| 7,006,473 B2 | 2/2006 | Zhao | |
| 7,158,558 B2 | 1/2007 | Petre et al. | |
| 7,197,307 B2 | 3/2007 | Kirla | |
| 7,242,938 B2 | 7/2007 | Kobylinski et al. | |
| 7,248,874 B2 | 7/2007 | Persson et al. | |
| 7,953,376 B2 * | 5/2011 | Jaatinen et al. ................. 455/84 |
| 2002/0061751 A1 * | 5/2002 | Zhao ............................. 455/442 |

FOREIGN PATENT DOCUMENTS

| | | | | |
|---|---|---|---|---|
| EP | 1 377 101 | * | 5/2003 | ............... H04Q 7/38 |
| EP | 1377101 | | 1/2004 | |

OTHER PUBLICATIONS

3GPP TS 25.331 V7.9.0 (May 2008), Technical Specification Group Radio Access Network; Radio Resource Control (RRC); Protocol Specification (Release 7).

* cited by examiner

*Primary Examiner* — Michael Faragalla
(74) *Attorney, Agent, or Firm* — McClure, Qualey & Rodack, LLP (57) ABSTRACT

A method for controlling radio links in a cellular communication system. The method comprises: receiving an active set update message from the system controller via at least one of the first radio link and the second radio link at the first user equipment to direct the first user equipment to terminate the first radio link, determining a communication status of the first radio link according to a current quality of the first radio link and a current quality of the second radio link after receiving the active set update message, and managing the first radio link and the second radio link according to the communication status.

19 Claims, 8 Drawing Sheets

METHODS FOR CONTROLLING RADIO LINKS IN A CELLULAR COMMUNICATION SYSTEM

BACKGROUND OF THE INVENTION

1. Field of the Invention

The invention relates to a method of controlling radio links in a UMTS (Universal Mobile Telecommunications System) cellular system, and more particularly to a method for intelligent mobile assisted soft handover in a UMTS cellular system.

2. Description of the Related Art

The UMTS (Universal Mobile Telecommunications System) is a third-generation mobile communications system (3G) which provides an enhanced range of multimedia services. The mobile communication system can be divided into two segments: a radio access network (RAN) that performs air-interface related functions and a core network (CN) that performs switching functions and interfaces to external networks such as the internet or a public-switched telephone network. The third-generation mobile communication system provides improvements in both the radio access network RAN and the core network CN. Currently, the most common form of UMTS uses WCDMA (Wideband Code Division Multiple Access) as the underlying air interface and is standardized by the 3rd Generation Partnership Project (3GPP).

In mobile communications systems, while a mobile station (MS, also known as user equipment, UE) moves between different cells, a connection must be kept from being dropped by the network. Such a procedure is called "handover" or "handoff". In CDMA or WCDMA systems, handover can be a hard handover or a soft handover. A hard handover is the process in which the MS is handed from one cell to the next in order to maintain a radio connection with the network. A hard handover results in the radio connection being broken between the network and the mobile, before a new radio connection is established with the network in the target cell. Meanwhile, a soft handover is the process where the radio links are added and abandoned in such a manner that the mobile always keeps at least one radio link established.

BRIEF SUMMARY OF THE INVENTION

Methods for controlling radio links in a cellular communication system are provided. An exemplary embodiment of such a method comprises: receiving an active set update message from the system controller via at least one of the first radio link and the second radio link at the first user equipment to direct the first user equipment to terminate the first radio link; determining a communication status of the first radio link according to a current quality of the first radio link and a current quality of the second radio link after receiving the active set update message; and managing the first radio link and the second radio link according to the communication status.

Another exemplary embodiment comprises: receiving an active set update message from the system controller via at least one of the first radio link and the second radio link at the first user equipment, and generating a first decision at the first user equipment for terminating the first radio link; generating a second decision for determining a communication status of the first radio link at the first user equipment according to a current quality of the first radio link and a current quality of the second radio link after the first decision is generated; and managing the first radio link and the second radio link according to the second decision.

Another exemplary embodiment comprises: receiving an active set update message from the system controller via at least one of the first radio link and the second radio link to direct the first user equipment to terminate the first radio link; determining whether to reject the active set update message; and transmitting a failure message to the system controller to indicate failure of the active set update, and continue communicating via the first radio link and the second radio link when determining rejection of the active set update message.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
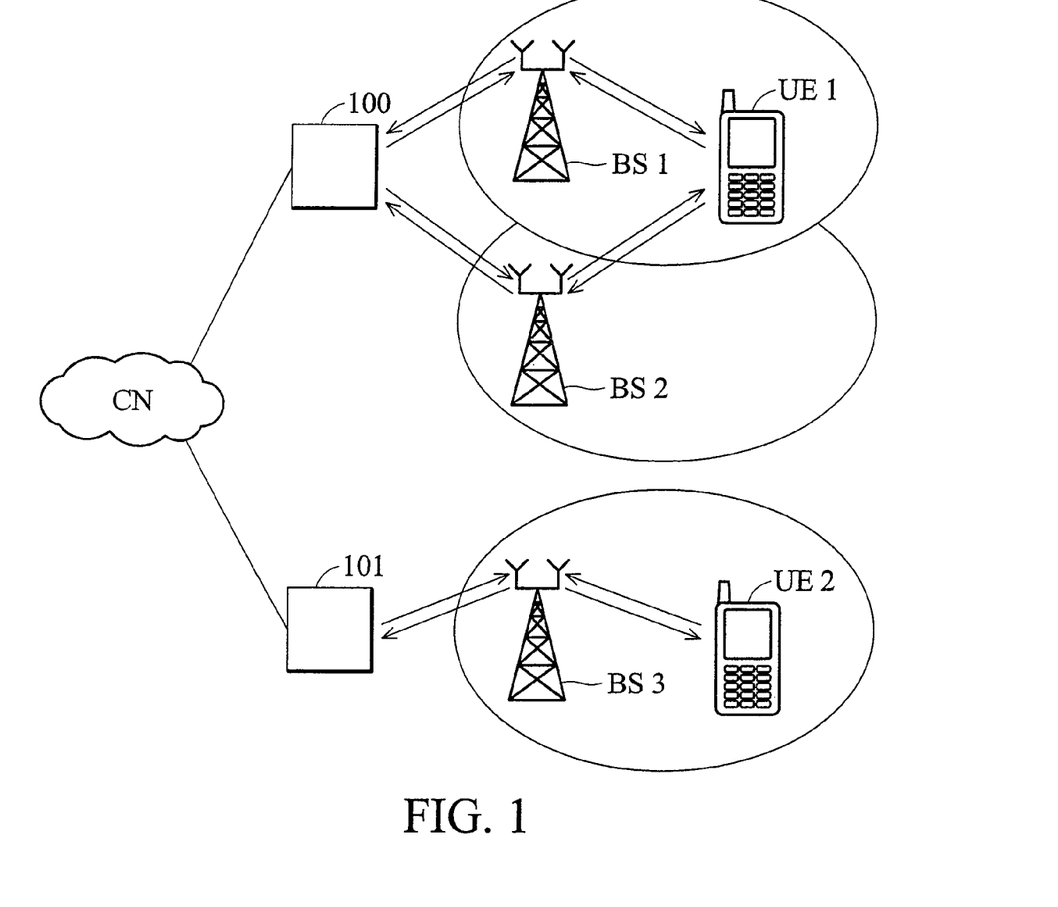
FIG. 1 shows an exemplary cellular communication network system.

FIG. 1 shows an exemplary cellular communication network system. As shown in FIG. 1, the user equipment UE 1 is in the overlapping cell coverage area belonging to different base stations BS 1 and BS 2, and user equipment UE 2 is in the cell coverage area belonging to base station BS 3. Because the user equipment UE 1 is in the overlapping cell coverage area, the communications between UE 1 and base stations take place concurrently via two air interface channels from the base stations respectively, and the data transmitted via the two air interface channels is combined using diversity scheme. The multiple radio links associated to base stations BS 1 and BS 2 forms an Active Set of UE 1, wherein the Active Set is a set of radio links simultaneously involved in a specific communication service between the UE and the UTRAN (UMTS Terrestrial Radio Access Network). When user equipment UE 1 communicates with user equipment UE 2, the communication is established via base stations BS 1, BS 2, BS 3, system controllers 100, 101, and the core network CN. Thus, UE 1 receives a plurality of messages from BS 1 and BS 2, including the signaling messages of the control channels and the user payload data messages (speech, fax, and data) of the traffic channel, and UE 2 also receives a plurality of messages from BS 3. In the cellular communication network system, system controller, as the system controllers 100 and 101 shown in FIG. 1, comprises a plurality of network-side elements for managing the radio access network interface. For example, system controller may include an RNC (Radio Network Controller) responsible for the control of radio resources of the UTRAN. The RNC controls the load and congestion of its own cells, and also executes the admission control and code allocation for new radio links to be established in its own cells.

When a communication is established, user equipment applies the measurement control which is directed from the network-side to perform event-triggered or periodical measurement reports of the pilot strength of base stations. Taking user equipment UE 1 in FIG. 1 as an example, UE 1 measures pilot strengths of base stations BS 1 and BS 2 periodically, or instantaneously according to the events directed by the system controller 100. The pilot signals of each base station are transmitted in the CPICH (Common Pilot Channel) burst. The CPICH, which is a signaling (control) channel in the UMTS, uses a predefined pilot sequence to allow the UE to equalize the channel in order to achieve a phase reference with the SCH (Synchronization Channel), and also allows the estimations of power control, by which the quality of each radio link can be obtained. After UE 1 measures the pilot strength of each base station, a measurement report will be transmitted back to the system controller 100, and the system controller 100 monitors the communication status of each radio link in the Active Set, and manages the radio links within the Active Set by deciding whether to add radio links in or to remove radio links from the Active Set according to the measurement report. When the system controller 100 determines to add or remove radio links in or from the Active Set, the system controller transmits an Active Set Update (ASU) message to the user equipment and a soft handover will be performed.

Figure 2:
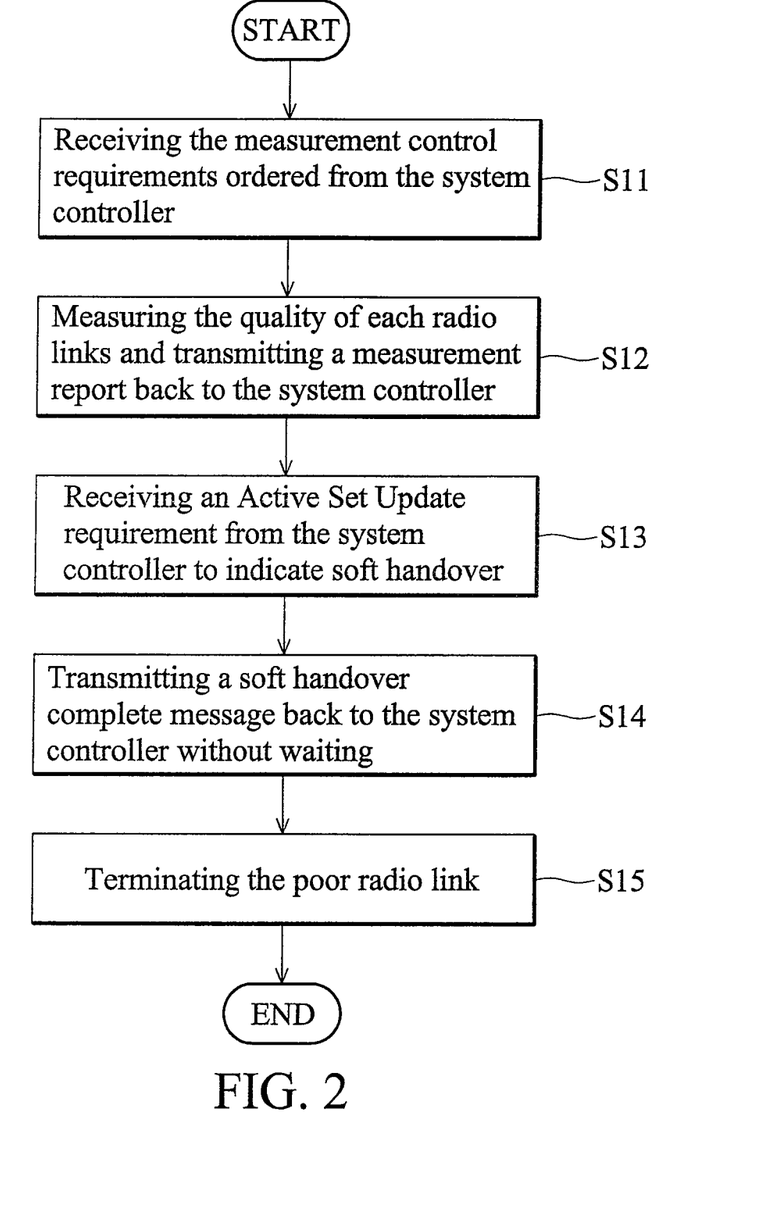
FIG. 2 shows an embodiment of the soft handover procedure performed at the UE side.

Taking user equipment UE 1 in FIG. 1 as an example again, FIG. 2 shows an embodiment of the soft handover procedure performed at the UE side. After the communication between UE 1 and UE 2 is established, UE 1 enters dedicated mode, and communicates with UE 2 through multiple radio links associated with base stations BS 1 and BS 2. During the communication, UE 1 receives the measurement control requirements directed from the system controller 100 (step S11). Next, UE 1 measures the quality of each radio link and transmits a measurement report back to the system controller 100 (step S12). It is assumed that the system controller 100 determines that the radio link quality of BS 1 is poor and plans on removing the radio link of BS 1 from the Active Set, UE 1 receives an Active Set Update requirement from the system controller 100 to indicate a soft handover (step S13). After judging that the Active Set Update message is a valid configuration, UE 1 follows the directive from the system controller 100 and transmits a soft handover complete message back to the system controller 100 without waiting (step S14). Finally, UE 1 terminates the radio link of BS 1 by ceasing transmitting and receiving of signals via the radio link of BS 1, and continues transmitting and receiving of signals via radio link of BS 2 (step S15). However, it should be noted that when the Active Set Update message is judged as being an "invalid configuration" due to improper content and operation, such as, "remove all radio link(s) in the Active Set", "adding and removing of radio links at the same time", or "number of radio links in the Active Set exceed maximum limitation", or others, the user equipment would respond with a failure message to the system controller, and continue the original radio links.

Figure 3:
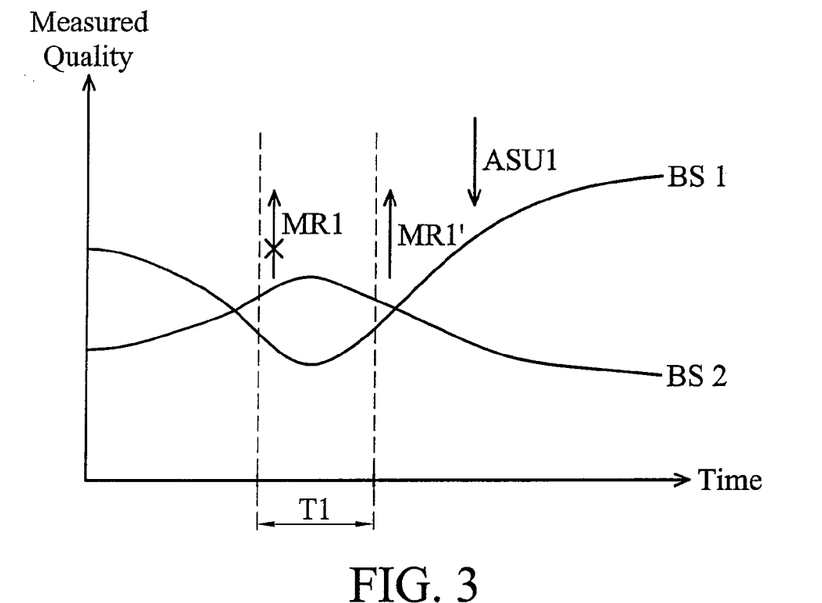
FIG. 3 shows an exemplary scenario illustrating variations of measured radio link qualities of BS 1 and BS 2 with transmission timings of measurement reports and Active Set Update messages.

FIG. 3 shows an exemplary scenario illustrating variations of measured radio link qualities of BS 1 and BS 2 with transmission timings of measurement reports and Active Set Update messages. As shown in FIG. 3, the measured radio link quality of BS 1 drops dramatically in the time interval T1 while radio link quality of BS 2 is slightly improved. A measurement report, labeled by MR1 in FIG. 3, is triggered to be sent during interval T1. However, the measurement report transmitted during the time interval T1 is not successful, and is retransmitted successfully after the radio link quality of BS 1 is improved (labeled by MR1' in FIG. 3). Thus, a non-real-time measurement report is sent to the system controller, and the falling pilot strength may trigger the system controller to respond to an Active Set Update message, labeled by ASU1 in FIG. 3, to terminate the radio link of BS 1. Unfortunately, the radio link of BS 1 becomes the dominate signal in the Active Set at the time the Active Set Update message ASU1 is received at the UE. If the message ASU1 is not an invalid configuration condition as mentioned above and the UE obeys the directive of the system controller to terminate the radio link of BS 1, the remaining radio link of BS 2 may be too poor to continue smooth conversations during communication, and call drop may occur.

Figure 4:
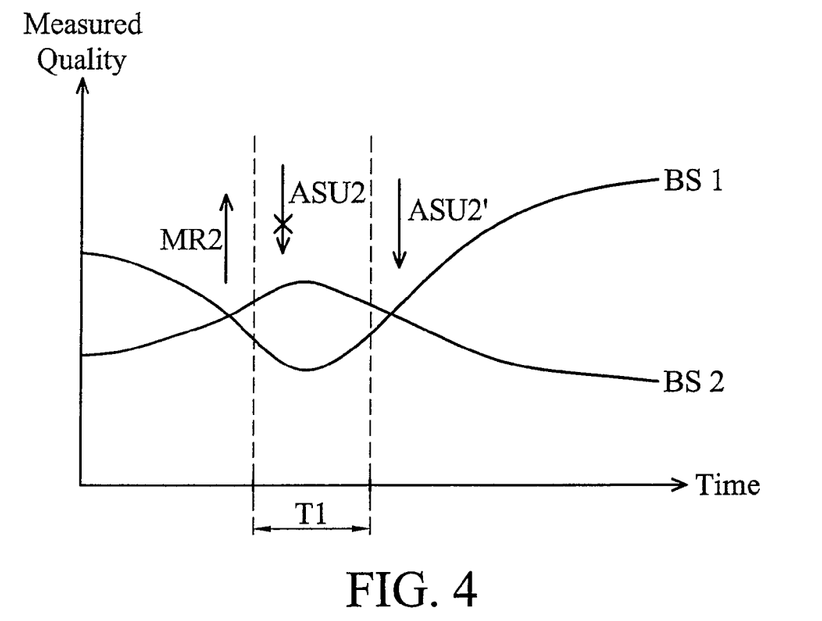
FIG. 4 shows another exemplary scenario illustrating variations of measured radio link qualities of BS 1 and BS 2 with transmission timings of measurement reports and Active Set Update messages.

FIG. 4 shows another exemplary scenario illustrating variations of measured radio link qualities of BS 1 and BS 2 with transmission timings of measurement reports and Active Set Update messages. As shown in FIG. 4, the measurement report MR2 is successfully sent to the network-side before the interval T1. However, the Active Set Update message ASU2 with the directive to terminate the radio link of BS 1 is not sent successfully, resulting from poor radio condition. Therefore, the directive of the system controller is not performed until receiving the retransmitted message ASU2'. The example is similar to the scenario as shown in FIG. 3, whereby the UE terminates the dominate signal, the radio link of BS 1. Thus, call drop may be occurred.

Figure 5:
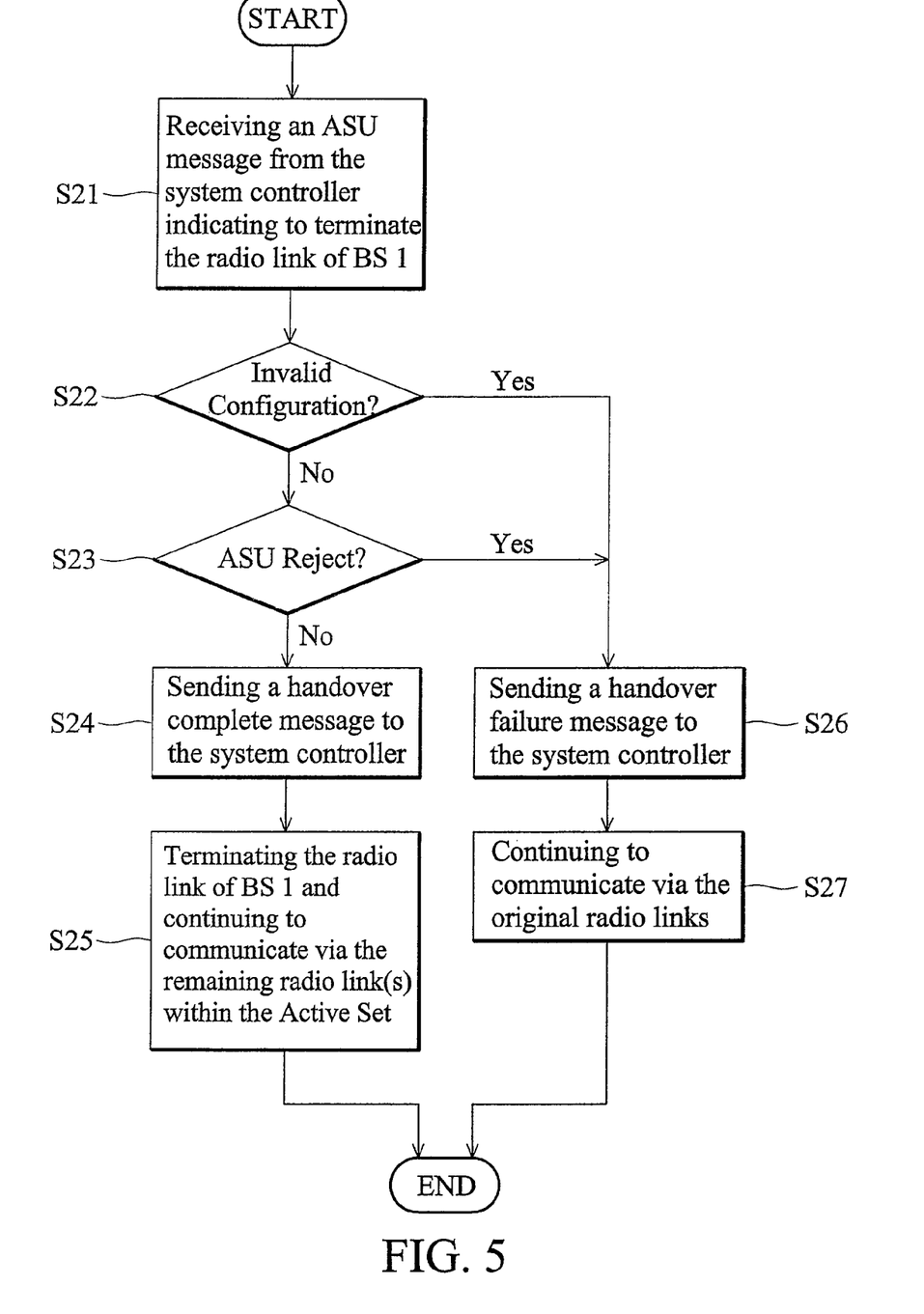
FIG. 5 shows the flowchart illustrating a radio link controlling method according to an embodiment of the invention.

In order to provide a more reliable network service, an embodiment of a novel method for controlling the radio links in a cellular communication system is introduced. FIG. 5 shows a flowchart illustrating a radio link controlling method according to an embodiment of the invention. For illustrative simplicity, the following paragraph mainly utilizes two radio links in the Active Set for discussion. However, it should be understood that an UE may be located in the overlapping cell coverage area of more than two base stations or communicate via more than two radio links, thus, the Active Set may includes more than two radio links and the invention should not limited thereto. The scope of the present invention shall be defined and protected by the following claims and their equivalents. It is assumed that a first user equipment is located in an overlapping cell coverage area belonging to different base stations and communicates with a second user equipment, such as the UE 1, UE 2, BS 1 and BS 2 in FIG. 3. The UE 1 receives a plurality of messages from the base stations, including the signaling messages of the control channels and the user payload data message (speech, fax, and data) of the traffic channel, and a system controller manages the radio links of the base stations. When the UE 1 receives an ASU message from the system controller indicating termination of the radio link of BS 1 (step S21), the UE 1 determines whether the ASU message is with an invalid configuration according to the content of the ASU message (step S22). When the ASU message is an invalid configuration, the UE 1 sends a handover failure message to the system controller (step S26), keeps the radio link of BS 1 and continues to communicate via the original radio links within the Active Set (e.g., radio links of BS 1 and BS 2 in FIG. 3) (step S27). When the ASU message is a valid configuration, the UE 1 further determines whether to reject the ASU message or not and determines the communication status of the radio link of BS 1 according to the messages received from the base stations (step S23), and manages the radio links within the Active Set according to the determined communication status. When determining rejection of the ASU message, the radio link of BS 1 will be continued regardless of the ASU message. Thus, the UE 1 sends a handover failure message to the system controller (step S26), keeps the radio link of BS 1 and continues to communicate via the radio links of BS 1 and BS 2 (step S27). On the other hand, when determining acceptance of the ASU message, the UE 1 sends a handover complete message to the system controller (step S24), terminates the radio link of BS 1, and continues to communicate via the remaining radio link(s) within the Active Set (e.g., radio link of BS 2 in FIG. 3) (step S25).

Figure 6:
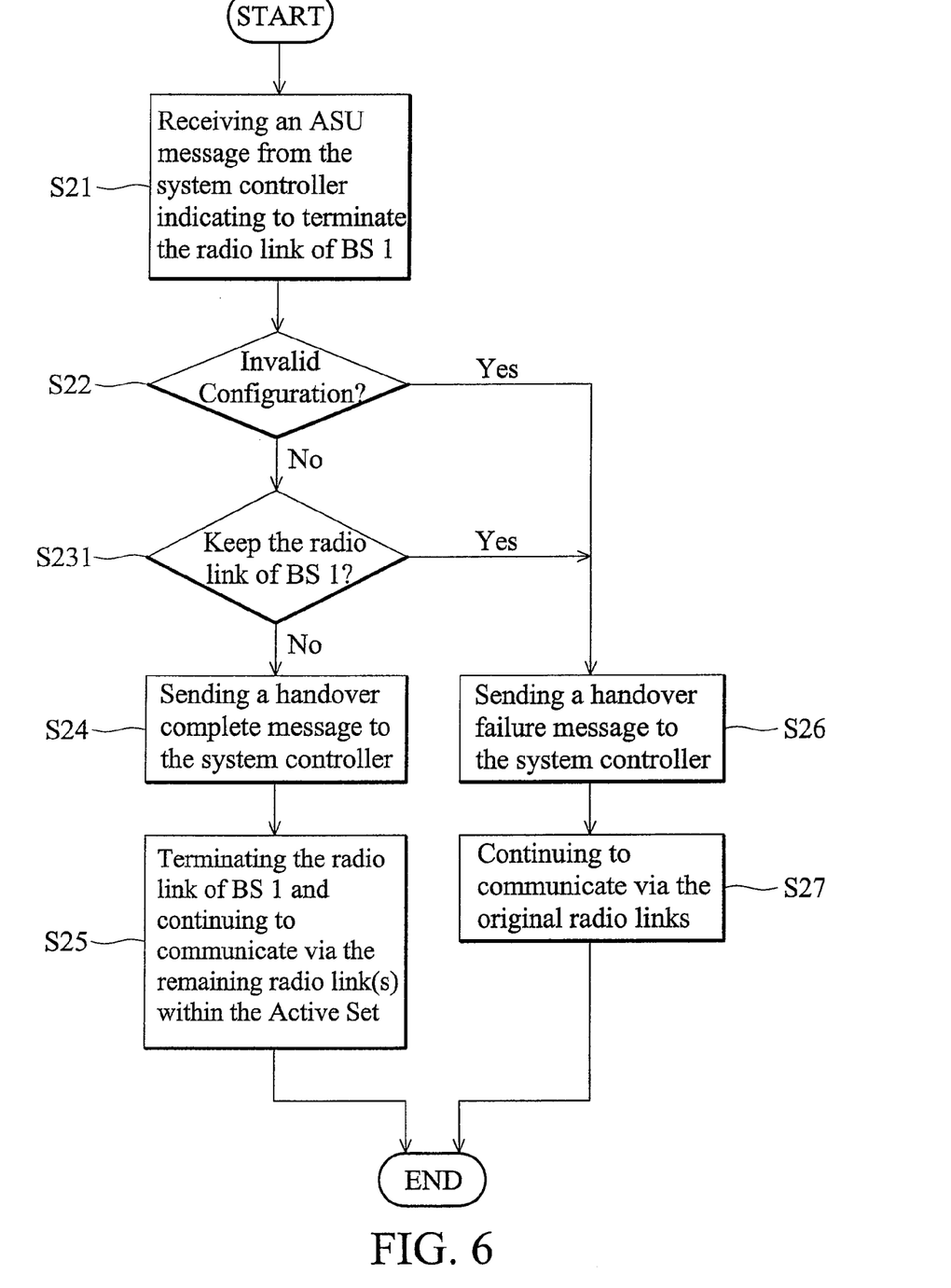
FIGS. 6-7 show the exemplary flowcharts with different combinations of judgment items according to the embodiments of the invention.
Figure 7:
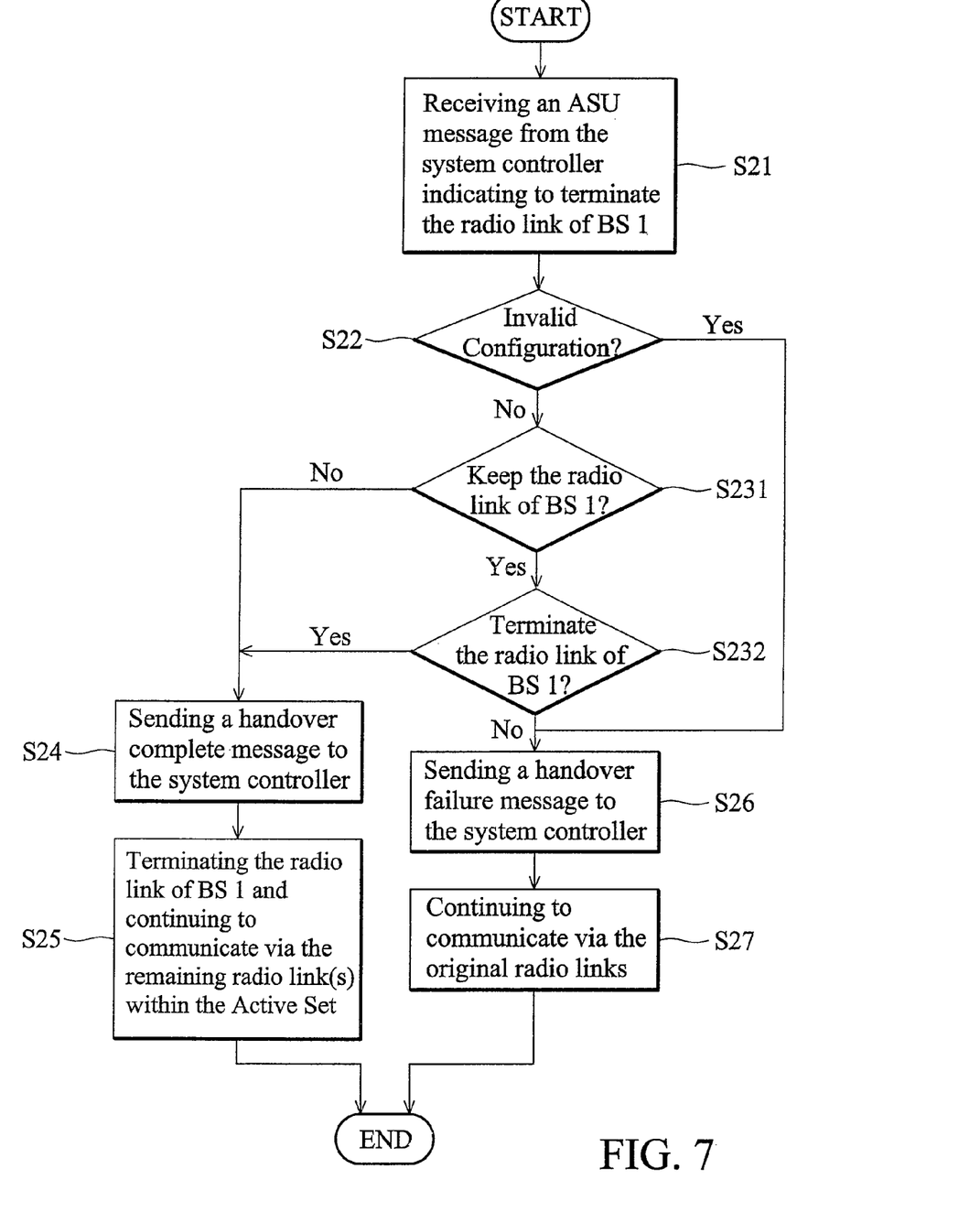

For the step of determining whether to reject the ASU message (step 23), one or a combination of multiple judgment items by AND/OR operations according to different designs may be applied. FIGS. 6-7 show exemplary flowcharts with different combinations of judgment items in step 23 according to embodiments of the invention. As shown in FIG. 6, the step of determining whether to reject the ASU message is to consider whether to keep the radio link of BS 1 (step S231) according to the current qualities of radio links of the Active Set. The judgment items used in step S231 may be: "Is the quality of removal radio link the best quality of all radio links of the Active Set?" (hereinafter called judgment A1); or "Is the best quality of the remaining radio links of the Active Set poor?" (hereinafter called judgment A2), or "Is the pilot strength of the removal radio link better than a reporting range?" (hereinafter called judgment A3); or "Is the pilot strength of the removal radio link better with an offset than the poorest quality of the pilot strength of the remaining radio links?" (hereinafter called judgment A4); or "Is the quality of the removal radio link better than a threshold$_{high}$?" (hereinafter called judgment A5), or any other judgments based on the considering reasons to keep the removal radio link, or any combination thereof. It is to be noted that the "removal radio link" refers to the radio link directed by the system controller to be terminated, such as the radio link of BS 1 in the above illustrative example, and the "remaining radio links" refer to the radio links except for the removal radio link within the Active Set.

In judgment A1, the current qualities of the radio links in the Active Set are measured again. As described above, the quality of the radio link is measured according to the quality of the pilot signals of each base station transmitted via the CPICH, for example, the power of the pilot signal or the signal to noise ratio (SNR) of the pilot signal. Since CPICH is a signaling (control) channel in the UMTS, the pilot signals can be obtained from the signaling messages received from each base station. If the current quality of removal radio link is the best quality of all radio links of the Active Set, the user equipment can decide to reject the ASU message and keep the radio link. In judgment A2, it is determined whether the best of the remaining radio links of the Active Set is in a poor condition. For example, if the best SNR with remaining radio links fall below the minimum acceptable threshold of a hardware device in the user equipment, the received signals will not be decoded correctly by a decoder or the connection will be dropped. Thus, the best of remaining radio links of the Active Set is in the poor condition. After determining that the best of remaining radio links of the Active Set is in the poor condition, the user equipment decides to reject the ASU message and keep the radio link.

In judgment A3, it is determined whether the pilot strength of the removal radio link is better than a reporting range, wherein the reporting range may be a dynamic range built up by the currently best and poorest radio link qualities of the other radio links (remaining radio links) of the Active Set. It is known in the art that judgment A3 is the same as the judgment of the standardized event 1A directed from the network. Thus, the user equipment judges whether the removal radio link would trigger a network event 1A, and determines to reject the ASU message and keep the radio link when the condition for triggering the network event 1A is achieved. Similar to judgment A3, judgment A4 is the same as another standardized event 1C directed from the network. Thus, the user equipment determines whether the condition for triggering the network event 1C has been achieved. If so, the user equipment determines to reject the ASU message and keep the radio link. In judgment A5, it is determined whether the quality of the removal radio link is better than a threshold$_{high}$. Compared to judgment A3, which uses the dynamic thresholds of the currently best and poorest radio link quality corresponding to the Active Set, judgment A5 compares the quality of the removal radio link with a static threshold. For example, as defined in the 3GPP standard, when the received signal code power (RSCP) in the CPICH is lower than −90 dBM, the radio link quality is regarded as poor, while when the received signal code power (RSCP) is higher than −80 dBM, the radio link quality is regarded as good. For another example, when the received signal to noise ratio $E_c/N_0$ (signal energy to noise power spectral density ratio) is lower than −15 dBM, the radio link quality is regarded as poor, while when the $E_c/N_0$ is higher than −10 dBM, the radio link quality is regarded as good. Thus, the threshold$_{high}$ may be chosen as the higher threshold of the RSCP or the $E_c/N_0$, and the user equipment can decide to reject the ASU message and keep the radio link when the quality of the removal radio link is better than the threshold$_{high}$.

FIG. 7 shows a flowchart according to another embodiment of the invention with further considering whether to terminate the radio link of BS 1 (step S232) according to the current qualities of radio links within the Active Set or according to the content of the ASU message when it is determined to keep the radio link of BS 1 by step S231. The judgment items used in step S232 may be: "Is the received ASU message substantially the same as the prior received one?" (hereinafter called judgment B1), or "Is the received ASU message not triggered by the measurement report?" (hereinafter called judgment B2), or "Is the quality of the removal radio link worse than reporting range?" (hereinafter called judgment B3), or "Is quality of the removal radio link worse than a threshold$_{low}$?" (hereinafter called judgment B4), or any other judgments based on the considering reasons to terminate the removal radio link, or any combination thereof.

In judgment B1, it is determined whether there is more than one ASU message continuously received by the user equipment to direct the user equipment to terminate the radio link of a specific base station. When there is more than one ASU message directing to terminate the same radio link received, the user equipment follows the directive from the network and terminates the radio link. In judgment B2, it is determined whether the received ASU message is triggered by the measurement report. When the user equipment judges that there is no measurement report which may impact the network to remove the radio link being sent by the user equipment over a predetermined time interval before now, the user equipment decides to accept the ASU message and terminates the radio link. In judgment B3, it is determined whether the quality of the removal radio link is worse than a reporting range, wherein the reporting range, as previously described above, may be a dynamic range of the currently best and poorest radio link qualities of the remaining radio links of the Active Set. It is known in the art that judgment B3 is the same as the judgment of the standardized event 1B directed from the network. Thus, the user equipment determines whether the removal radio link may trigger network event 1B, and determines to accept the ASU message and terminate the radio link when the condition for triggering the network event 1B has been achieved. In judgment B4, it is to determine whether quality of the removal radio link is worse than a threshold$_{low}$. As described above, the threshold$_{low}$ may be chosen as the lower threshold of RSCP or $E_c/N_0$, and the user equipment decides to accept ASU message and terminate the removal radio link when the quality of the removal radio link is worse than a threshold$_{low}$.

Thus, as shown in FIG. 7, when the user equipment determines that the ASU message is a valid configuration, the user equipment generates a first decision to terminate the radio link. After that, the user equipment further generates a second decision by steps S231-S232 for determining the communication status of the removal radio link according to the received messages. Firstly, user equipment determines whether to keep the removal radio link (step S231) according to the qualities of current radio links within the Active Set as described in the previous above paragraph. When the user equipment determines not to keep the radio link of BS 1 by step S231, the user equipment sends a handover complete message to the system controller (step S24), terminates the radio link of BS 1, and continues to communicate via the remaining radio link(s) within the Active Set (step S25). When the user equipment determines to keep the radio link of BS 1 in step S231, the user equipment further determines whether to terminate the radio link of BS 1 (step S232) according to the qualities of current radio links within the Active Set or according to the content of the ASU message as described in the previous paragraph. When the user equipment determines to terminate the radio link of BS 1, the user equipment sends a handover complete message to the system controller (step S24), terminates the radio link of the BS 1, and continues to communicate via the remaining radio link(s) within the Active Set (step S25). Otherwise, the user equipment sends a handover failure message to the system controller (step S26), keeps the radio link of the BS 1 and continues to communicate via the original radio links within the Active Set (step S27). In this way, the second decision is opposite to the first decision.

Figure 8:
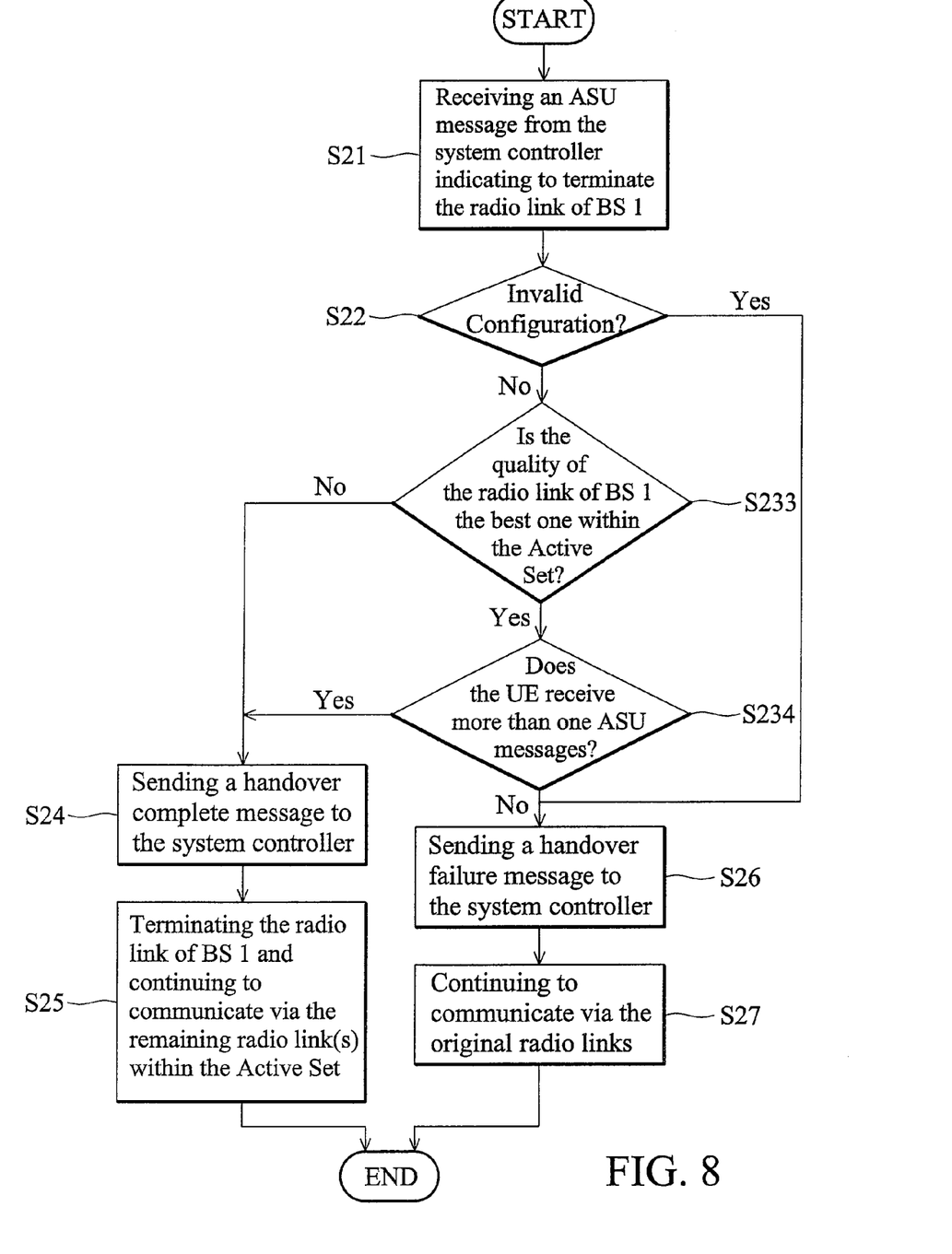
FIG. 8 shows an exemplary flowchart illustrating a radio link controlling method according to an embodiment of the invention.

FIG. 8 shows an exemplary flowchart illustrating a radio link controlling method according to one embodiment of the invention. As shown in FIG. 8, when the user equipment determines that the ASU message is a valid configuration, user equipment generates a first decision to terminate the radio link of BS 1. Next, user equipment further generates a second decision by steps S233-S234 for determining the communication status of the radio link of BS 1 according to the received messages. Firstly, the user equipment determines whether the quality of the radio link of BS 1 is the best one within the Active Set (step S233). When the quality of the radio link of BS 1 is not the best one within the Active Set, the user equipment sends a handover complete message to the system controller (step S24), terminates the radio link of BS 1, and continues to communicate via the remaining radio link(s) within the Active Set (step S25). When the user equipment determines the quality of the radio link of BS 1 is the best one within the Active Set, the user equipment further determines whether there are more than one ASU message continuously received (step S234). When there are more than one ASU message that directs the user equipment to terminate the radio link of BS 1 are continuously received, the user equipment sends a handover complete message to the system controller (step S24), terminates the radio link of BS 1, and continues to communicate via the remaining radio link(s) within the Active Set (step S25). Otherwise, the user equipment sends a handover failure message to the system controller (step S26), keeps the radio link of BS 1 and continues to communicate via the original radio links within the Active Set (step S27). In this way, the second decision is opposite to the first decision.

Figure 9:
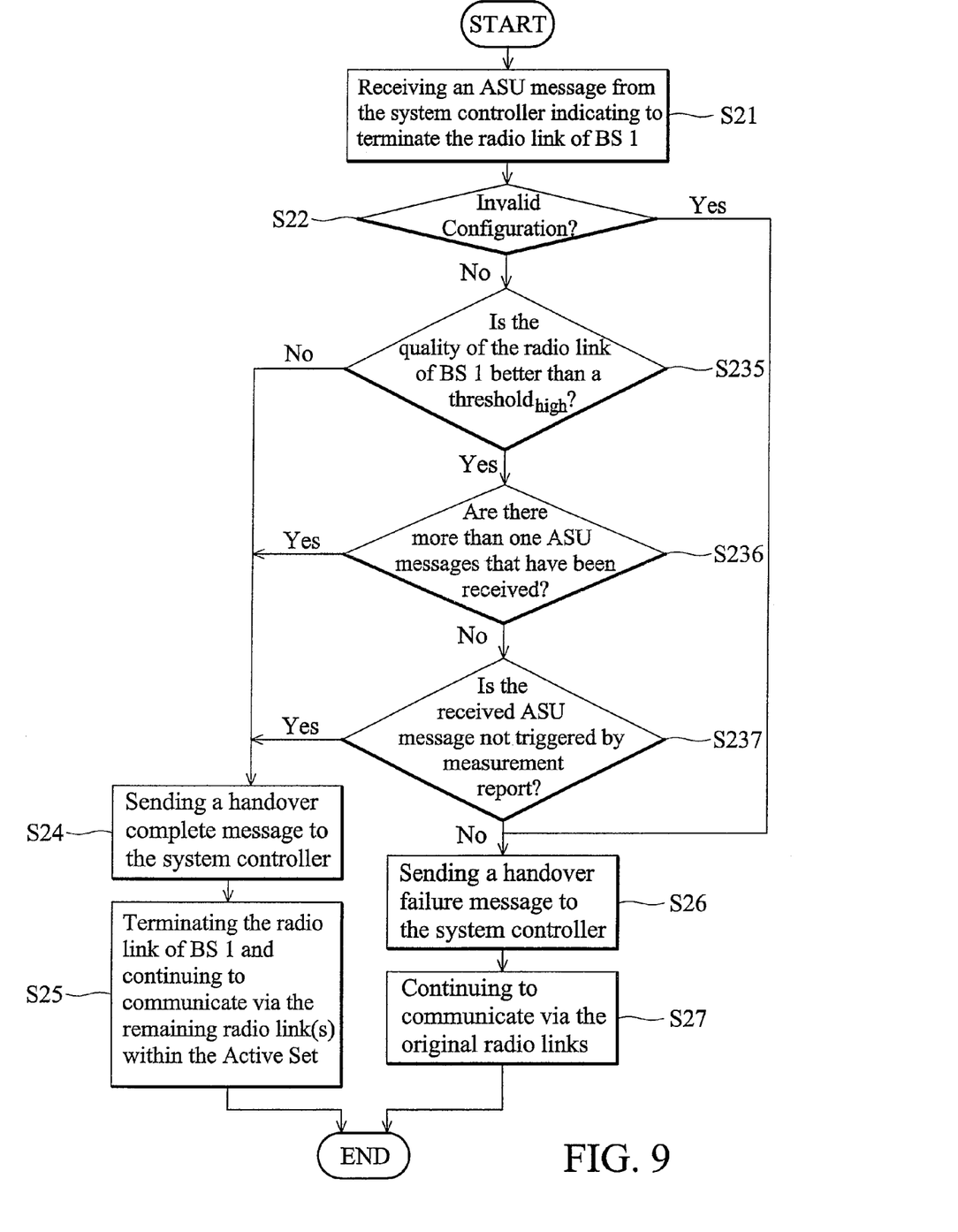
FIG. 9 shows another exemplary flowchart illustrating a radio link controlling method according to an embodiment of the invention.

FIG. 9 shows another exemplary flowchart illustrating a radio link controlling method according to an embodiment of the invention. As shown in FIG. 9, when user equipment determines that the ASU message is a valid configuration, user equipment generates a first decision to terminate the radio link of BS 1. Next, user equipment further generates a second decision by steps S235-S237 for determining the communication status of the radio link of BS 1 according to the received messages. Firstly, user equipment determines whether the quality of the radio link of BS 1 is better than a threshold$_{high}$ (step S235). For example, user equipment determines whether the RSCP of the radio link of BS 1 is higher than −80 dBM or whether the $E_c/N_0$ of the radio link of BS 1 is higher than −10 dBM. When the quality of the radio link of BS 1 is not better than threshold$_{high}$, user equipment sends a handover complete message to the system controller (step S24) terminates the radio link of BS 1, and continues to communicate via the remaining radio link(s) within the Active Set (step S25). When the user equipment determines the quality of the radio link of BS 1 is better than threshold$_{high}$, user equipment further determines whether there is more than one ASU message that have been continuously received (step S236). When there are more than one ASU message that direct the user equipment to terminate the radio link of BS 1 have been continuously received, user equipment sends a handover complete message to the system controller (step S24), terminates the radio link of BS 1, and continues to communicate via the remaining radio link(s) within the Active Set (step S25). Otherwise, the user equipment further determines whether the received ASU message is not triggered by a measurement report have been sent (step 237). When the received ASU message is not triggered by a measurement report have been sent, the user equipment sends a handover complete message to the system controller (step S24) terminates the radio link of BS 1, and continues to communicate via the remaining radio link(s) within the Active Set (step S25). Otherwise, the user equipment sends a handover failure message to the system controller (step S26), keeps the radio link of BS 1, and continues to communicate via the original radio links within the Active Set (step S27). In this way, the second decision is opposite to the first decision.

With the method of intelligent mobile assisted soft handover, a more effective communication status of the removal radio link can be determined in the UE side by further considering the current quality of the removal radio link. Thus, a more reliable network service can be provided.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for controlling radio links in a cellular communication system, executed by a first user equipment, wherein the cellular communication system comprises the first user equipment, a second user equipment, a first base station, a second base station, and a system controller, and the first user equipment receives a plurality of messages from the first base station and the second base station and communicates with the second user equipment via a first radio link of the first base station and a second radio link of the second base station, the first radio link and the second radio link form an active set of the first user equipment, and the system controller manages the first radio link and the second radio link, the method comprising:

receiving, an active set update message from the system controller via at least one of the first radio link and the second radio link, wherein the active set update message directs the first user equipment to terminate the first radio link;

a4~ determining whether a content of the active set update message specifies a valid configuration;

determining whether to continue a communication status of the first radio link when the content of the active set update message specifies a valid configuration;

transmitting a failure message to the system controller to indicate failure of the active set update, and continuing the first radio link and the second radio link when the communication status of the first radio link is determined to be continued and transmitting a complete message to the system controller to indicate completion of the active set update, and terminating the first radiolink when the communication status of the first radio link is determined to be terminated.

2. The method as claimed in claim 1, wherein whether to continue the first radio link is determined according to a first judgment corresponding to the current quality of the first radio link and the current quality of the second radio link within the active set.

3. The method as claimed in claim 2, wherein whether to continue the communication status of the first radio link is determined by further considering whether to terminate the first radio link according to a second judgment corresponding to the current quality of the first radio link and the current quality of the second radio link within the active set or according to the content of the received active set update message.

4. The method as claimed in claim 1, wherein the current quality of the first radio link and the current quality of the second radio link are measured according to a plurality of pilot signals carried in the messages received from the first base station and the second base station, respectively.

5. The method as claimed in claim 2, wherein the first judgment is to judge whether the current quality of the first radio link is the best quality of all radio links of the active set, or to judge whether the current quality of the first radio link is better with a predetermined offset than the poorest quality of a radio link of the active set, or to judge whether the current quality of the first radio link is better than a first predetermined threshold, or any combination thereof.

6. The method as claimed in claim 3, wherein the second judgment is to judge whether the first user equipment has received more than one active set update message to direct the first user equipment to terminate the first radio link, or to judge whether the received active set update message was not triggered by a measurement report, or to judge whether the current quality of the first radio link is worse than a second predetermined threshold, or any combination thereof.

7. A method for controlling radio links in a cellular communication system, executed by a first user equipment, wherein the cellular communication system comprises the first user equipment, a second user equipment, a first base station, a second base station, and a system controller, and the first user equipment receives a plurality of messages from the first base station and the second base station and communicates with the second user equipment via a first radio link of the first base station and a second radio link of the second base station, the first radio link and the second radio link form an active set of the first user equipment, and the system controller manages the first radio link and the second radio link, the method comprising:

receiving, by the first user equipment, an active set update message from the system controller via at least one of the first radio link and the second radio link, wherein the active set update message directs the first user equipment to terminate the first radio link;

determining whether a content of the active set update message specifies a valid configuration;

determining, by the first user equipment, whether to reject the active set update message when the content of the active set update message specifies a valid configuration; and transmitting, by the first user equipment, a failure message to the system controller to indicate failure of the active set update, and continue communicating via the first radio link and the second radio link when determining rejection of the active set update message and transmitting a complete message to the system controller to indicate completion of the active set update, and terminating the first radiolink when the communication status of the first radio link is determined to be terminated.

8. The method as claimed in claim 7, further comprising determining rejection of the active set update message when a current quality of the first radio link is better than the other radio links of the active set.

9. The method as claimed in claim 7, further comprising determining rejection of the active set update message when a currently best quality of the other radio links of the active set falls below a minimum acceptable threshold to result in incorrectly decoding of received signals via the radio link with the currently best quality.

10. The method as claimed in claim 7, further comprising determining rejection of the active set update message when a pilot strength of the first radio link is better than a reporting range between a currently best quality and a currently poorest quality of the other radio links of the active set.

11. The method as claimed in claim 7, further comprising determining rejection of the active set update message when a pilot strength of the first radio link is better with an offset than a poorest quality of the other radio links of the active set.

12. The method as claimed in claim 7, further comprising determining rejection of the active set update message when a current quality of the first radio link is better than a predefined threshold.

13. The method as claimed in claim 7, further comprising:
determining whether to confirm the rejection when determining rejection of the active set update message; and
transmitting a failure message to the system controller to indicate failure of the active set update, and continue communicating via the first radio link and the second radio ink when determining that the rejection is confirmed.

14. The method as claimed in claim 13, further comprising determining the rejection confirmation when another active set update message directing the first user equipment to terminate the first radio link is previously received.

15. The method as claimed in claim 13, further comprising determining the rejection confirmation when the received active set update message is not triggered by a measurement report being sent by the first user equipment over a predetermined time interval before now.

16. The method as claimed in claim 13, further comprising determining the rejection confirmation when a current quality of the first radio link is not worse than a reporting range between a currently best quality and a currently poorest quality of the other radio links of the active set.

17. The method as claimed in claim 13, further comprising determining the rejection confirmation when a current quality of the first radio link is not worse than a predetermined threshold.

18. A method for controlling radio links in a cellular communication system, executed by a first user equipment, wherein the cellular communication system comprises the first user equipment, a second user equipment, a first base station, a second base station, and a system controller, and the first user equipment receives a plurality of messages from the first base station and the second base station and communicates with the second user equipment via a first radio link of the first base station and a second radio link of the second base station, the first radio link and the second radio link form an active set of the first user equipment, and the system controller manages the first radio link and the second radio link, the method comprising:
- receiving an active set update message from the system controller via at least one of the first radio link and the second radio link, wherein the active set update message directs the first user equipment to terminate the first radio link; determining whether a content of the active set update message specifies a valid configuration;
- determining whether to terminate the first radio link when the content of the active set update message specifies a valid configuration; and
- transmitting a failure message to the system controller to indicate failure of the active set update, and continue communicating via the first radio link and the second radio link when determining not to terminate the first radio link and
- transmitting a complete message to the system controller to indicate completion of the active set update, and terminating the first radiolink when the communication status of the first radio link is determined to be terminated.

19. The method as claimed in claim 18, further comprising:
- transmitting a complete message to the system controller to indicate completion of the active set update, and terminating the first radio link when determining to terminate the first radio link.

* * * * *